United States Patent [19]

Botsford, III et al.

[11] Patent Number: 5,734,419
[45] Date of Patent: Mar. 31, 1998

[54] METHOD OF ENCODER CONTROL

[75] Inventors: Nelson Botsford, III, Somerville; Alireza Farid Faryar, Fair Haven; Rajesh Hingorani, Princeton Junction; Kim Nigel Matthews, Watchung; David Thomas, Summit; Siu-Wai Wu, High Bridge, all of N.J.

[73] Assignee: Lucent Technologies Inc., Murray Hill, N.J.

[21] Appl. No.: 327,530

[22] Filed: Oct. 21, 1994

[51] Int. Cl.$^6$ .................................................. H04N 5/14
[52] U.S. Cl. ............................................ 348/97; 348/700
[58] Field of Search .......................... 348/700, 97, 424, 348/426, 427, 439, 441, 595, 722, 558

[56] References Cited

U.S. PATENT DOCUMENTS

| | | |
|---|---|---|
| 4,799,154 | 1/1989 | Matthews et al. . |
| 4,853,681 | 8/1989 | Takashima . |
| 5,040,062 | 8/1991 | Knauer et al. . |
| 5,043,808 | 8/1991 | Knauer et al. . |
| 5,128,658 | 7/1992 | Pappas et al. . |
| 5,128,756 | 7/1992 | Johnston et al. . |
| 5,134,475 | 7/1992 | Johnston et al. . |
| 5,134,477 | 7/1992 | Knauer et al. . |
| 5,136,377 | 8/1992 | Johnston et al. . |
| 5,140,414 | 8/1992 | Mowry . |
| 5,144,423 | 9/1992 | Knauer et al. . |
| 5,155,588 | 10/1992 | Levien . |
| 5,170,251 | 12/1992 | Levy . |
| 5,196,924 | 3/1993 | Lumelsky et al. . |
| 5,204,664 | 4/1993 | Hamakawa . |
| 5,214,507 | 5/1993 | Aravind et al. . |
| 5,220,647 | 6/1993 | Kumagai . |
| 5,231,484 | 7/1993 | Gonzales et al. . |
| 5,243,419 | 9/1993 | Faryar et al. . |
| 5,245,436 | 9/1993 | Alattar ............................. 348/595 |
| 5,247,363 | 9/1993 | Sun et al. . |
| 5,253,056 | 10/1993 | Puri et al. . |
| 5,260,787 | 11/1993 | Capitant et al. . |
| 5,262,855 | 11/1993 | Alattar et al. ..................... 348/424 |
| 5,267,035 | 11/1993 | Weckenbrock et al. . |
| 5,270,813 | 12/1993 | Puri et al. . |
| 5,276,798 | 1/1994 | Peaslee et al. . |
| 5,278,647 | 1/1994 | Hingorani et al. . |
| 5,289,565 | 2/1994 | Smith et al. . |
| 5,293,229 | 3/1994 | Iu . |
| 5,294,974 | 3/1994 | Naimpally et al. . |
| 5,305,102 | 4/1994 | Knauer et al. . |
| 5,317,398 | 5/1994 | Casavant et al. . |
| 5,325,125 | 6/1994 | Naimpally et al. . |
| 5,404,174 | 4/1995 | Sugahara ........................... 348/700 |
| 5,491,516 | 2/1996 | Casavant et al. .................. 348/401 |

OTHER PUBLICATIONS

SMPTE Standard For Television—Component Video Signal 4:2:2—Bit Parallel Digital Interface, ANSI/SMPTE, 125M–1992, Society of Motion Picture and Television Engineers, Jul. 16, 1992, pp. 16–18.

MPEG Test Model 4, "Coded Representation of Picture and Audio Information", ISO–IEC/JTC1/SC29/EG11, SG CCITT XV, Working Party XV/1, Document AVC–445b, Feb. 1993.

*Primary Examiner*—Amelia Au

[57] ABSTRACT

A video encoder control system and method are disclosed for controlling a video encoder using a processor having a multiple field delay circuit for delaying input video data by a predetermined number of frames, and a statistics generator for generating statistics from the video data to control the encoder. The statistics generator calculates a sum of absolute values of field differences between pixels, with the sum used for detecting a redundant field, for generating a film flag, and for controlling the encoder using the film flag. The statistics generator calculates averages of blocks of pixels, and a fade detector uses the averages for detecting fades between successive frames to generate a fade flag to control the encoding. The rate controller responds to the statistics to change the resolution of the encoding of successive frames. The processor outputs the film flags, scene change flags, and fade flags to the rate controller to control the encoding of the delayed video data. A method is disclosed for controlling the video encoder including the steps of delaying the input video data, generating frame statistics, and controlling the encoder using the statistics.

32 Claims, 4 Drawing Sheets

METHOD OF ENCODER CONTROL

BACKGROUND OF THE INVENTION

1. Field of the Invention

This disclosure relates to video encoders and, in particular, to a system and method for controlling a video encoder to detect and effect changes in video signals.

2. Description of the Related Art

Image compression systems are used to digitize video into a minimal number of bits while maintaining maximum image quality. The Motion Picture Experts Group (MPEG) standard defines some techniques useful in image compression. Some implementations provide for image compression in video encoders but retain redundancy in the data during the compression.

Film material in the input video images such as images shot at 24 frames per second may be converted to 60 fields per second video in a process known in the art as 3:2 pulldown, where each video frame is recorded alternately on three fields of video and two fields of video. However, 3:2 pulldown methods result in redundancy in the conversion. Detection and removal of such redundancies may result in a removal of one field per five fields without a resulting loss of information while reducing by 20% the video image data to be stored and processed. As it has been estimated that 90% of prime time television material is derived from film sources, such a reduction of video image data of 20% without incurring a loss of image information significantly saves data capacity in video encoding.

In attempting to detect and remove such redundancies in image fields, false detection of 3:2 pulldown in mixtures of film and video or mixtures of different films may result in unacceptable reconstruction artifacts in subsequent processing of the compressed images, such as image decoding.

In addition, the anticipation of changes in incoming video and corresponding modification of encoding parameters thereof is known in the art. In such anticipatory methods, the erroneous placement of intra frames; i.e. refresh frames or I frames, may result in lesser quality in subsequent decoding. For example, regular video frames are generally predicted from at least the previous frame, with intra frames sent periodically to a receiver facilitating the receiver's acquisition of the video images. Such intra frames as well as frames from scene changes generally require more bits to encode than regular video frames, especially since scene changing frames are effectively unpredictable frames. If an intra frame occurs just before or just after a scene change, the average bit rate required for encoding may increase to a level that the quality of the encoding is reduced, resulting in subsequent visible artifacts upon decoding.

SUMMARY

A video encoder control system is disclosed for controlling a video encoder, including a processor having a multiple field delay circuit for delaying input video data by a predetermined number N, N>1, to generate delayed video data; a statistics generator for processing the input video data to generate statistics of a first frame and successive frames and to generate a control signal from the statistics; an encoder module; and a rate controller which responds to the control signal to control the encoding of the delayed video data corresponding to the first frame by the encoder module. The statistics generator calculates a sum of absolute values of differences between field pixels and calculates subsampled low pass filter image values; and a pulldown detector is included which uses the sum for detecting a redundant field in the associated fields, for generating a redundancy flag as the control signal corresponding to the redundant field.

A scene change detector is included which uses the sums for detecting a scene change from the first frame and a successive frame and for generating a scene change flag as the control signal. The statistics generator also determines an average pixel value of each frame; and a fade detector uses the average pixel values of the first field and the successive fields to determine a video fade.

A resolution selector is provided which uses the sum to generate a resolution select signal which the rate controller uses to change the resolution of the encoding of the successive frame. The outputs of the processor, including film flags, scene change flags, and fade flags, to the rate controller to control the encoding of the delayed video data.

A method is also disclosed for controlling a video encoder to encode input video data corresponding to a plurality of frames. The method includes the steps of delaying the input video data by a predetermined number N of frames, N>1, as delayed video data; processing the input video data to generate statistics of the first video frame; and controlling the encoding of the delayed video data corresponding to the first frame by the video encoder using the statistics.

BRIEF DESCRIPTION OF THE DRAWINGS

The features of the disclosed video encoder control system and method will become more readily apparent and may be better understood by referring to the following detailed description of an illustrative embodiment of the present invention, taken in conjunction with the accompanying drawings, where.

DESCRIPTION OF THE PREFERRED EMBODIMENTS

Figure 1:
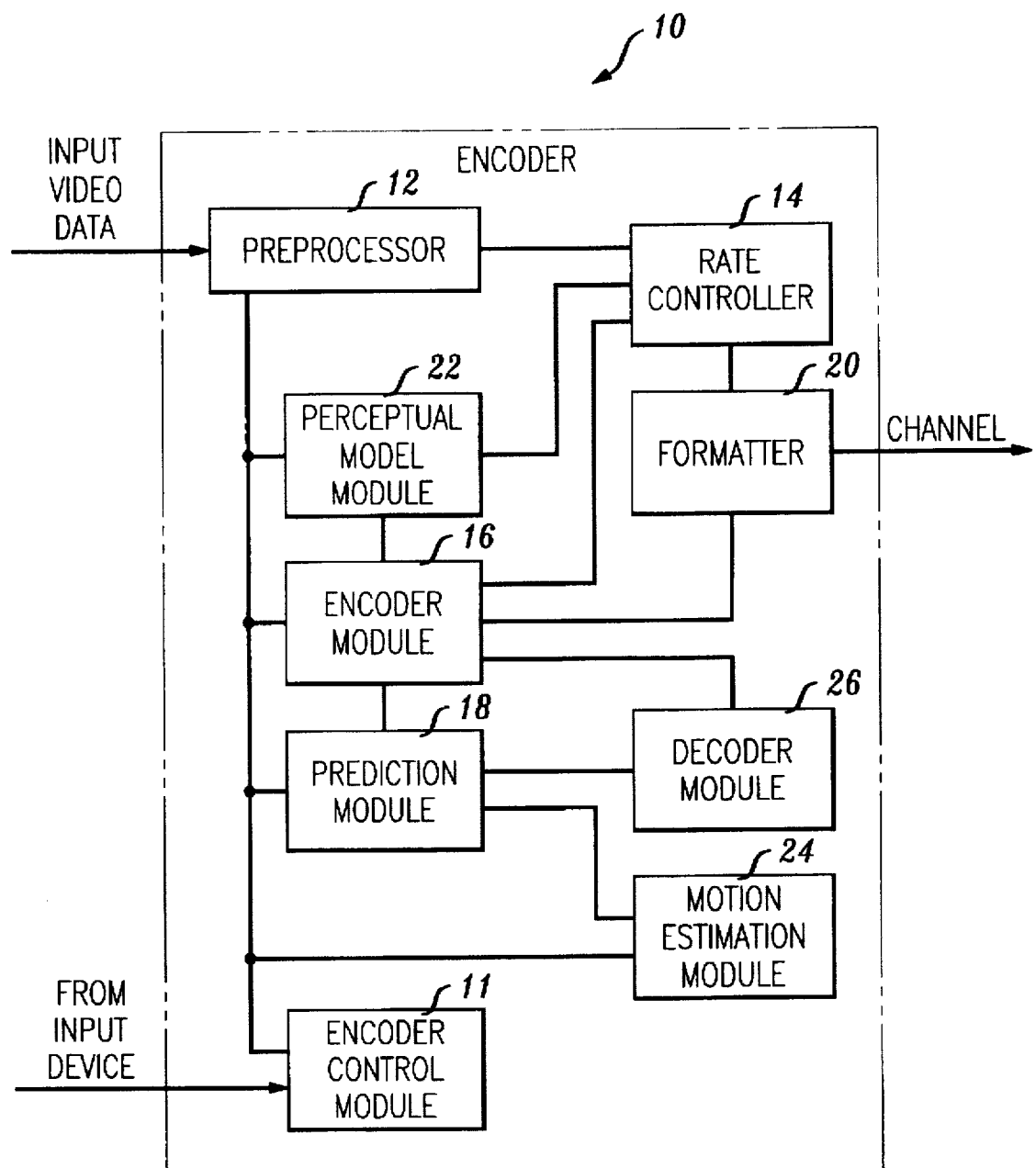
FIG. 1 is a block diagram of the disclosed video encoder.

Referring now in specific detail to the drawings, with like reference numerals identifying similar or identical elements, as shown in FIG. 1, the present disclosure relates to a video encoder control system and method for detecting and effecting changes in video frames in a video encoder 10.

As known in the art and used throughout the following disclosure, blocks of pixels (or pels) are arranged in lines and rows to constitute an image. Each pixel is associated with three components: luminance Y, red color difference $C_r$, and blue color difference $C_b$. Video data arranged in fields operating at 59.94 Hz (about 60) for video in the National Television System Committee (NTSC) standard and at 50 Hz for video in the Phase Alternation Line (PAL) standard. Under NTSC and PAL standards, pairs of fields are arranged in frames, in which FIELD1 refers to the first field to be displayed in time, known as an odd field, and FIELD2 refers to the second field to be displayed, known as an even field. Thus, each field is associated with a parity; i.e. even or odd.

Such fields may also be categorized as intra fields (I fields), predictive fields (P fields), and bidirectional fields (B fields), with frames designated in like manner as I frames, P frames, and B frames.

As shown in the exemplary embodiment of FIG. 1, the encoder 10 includes an encoder control module 11 for receiving commands and other inputs from an input device (not shown), a preprocessor 12 for detecting film frames and scene changes in a video input; a rate controller 14; an encoder module 16; a prediction module 18; a formatter 20; a perceptual model module 22; a motion estimation module 24; and a decoder module 26. These components of the video encoder 10 may be implemented in a manner known in the art, as described, for example, in U.S. Pat. Nos. 5,144,423 to Knauer et al.; 5,231,484 to Gonzales at al.; 5,247,363 to Sun et al.; 5,293,229 to Iu; and 5,325,125 to Naimpally et al., each of which are incorporated herein by reference.

Generally, for the video encoder control system and method disclosed herein, the preprocessor 12 receives input video data and command inputs processed by the encoder control module 11 and removes redundant fields from video data corresponding to a film source. The rate controller 14 receives data signals such as flags from the preprocessor 12 to control the operation of the encoder 10 for performing encoding functions. The rate controller 14 also controls communications of the encoder 10 with external systems in order to maintain the encoded bit rate within an operating bandwidth. The encoder module 16 receives processed video data from the preprocessor 12 as well as prediction estimates from the prediction module 18 for encoding the preprocessed video data. The formatter 20 combines the various data fields with blocks of pixels of video frames to generate an encoded output signal for output through an output channel.

The perceptual model module 22 calculates coding parameters for the encoding process, and the motion estimation module 24 performs block matching of video data in a current block of pixels with previous image data to generate motion factors. The decoder module 26 generates a reconstructed prediction error from the encoding process to construct a decoded image.

Figure 2:
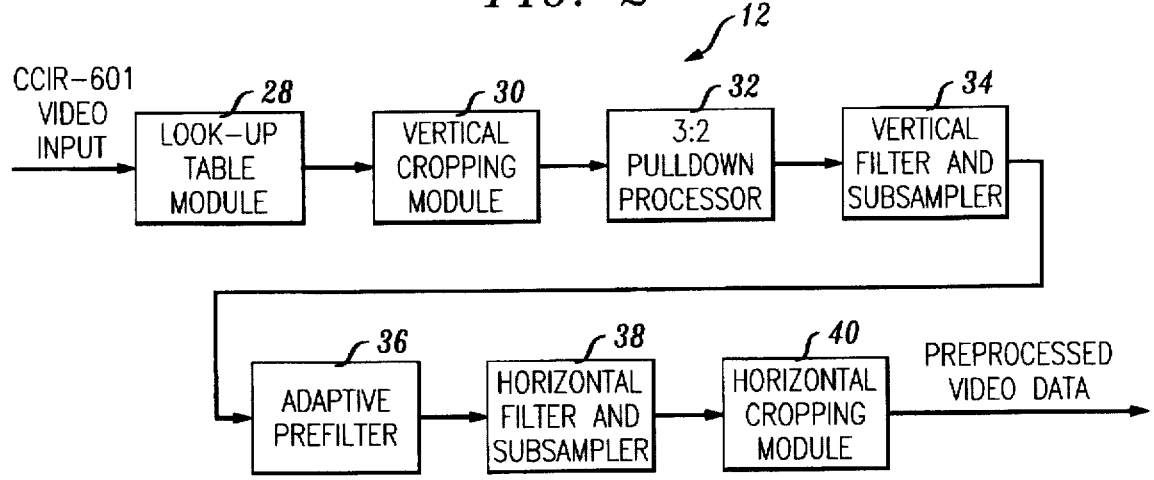
FIG. 2 is a block diagram of a preprocessor.

As illustrated in FIG. 2 for an exemplary embodiment, the preprocessor 12 includes a look-up table module 28 which receives input video data in the CCIR-601 standard format for performing optional gamma correction, pedestal adjustment, contrast enhancement, and the like in a manner known in the art. Separate tables are maintained in the look-up table module 28 for luma and chroma signals. The input video signal passes through the look-up table module 28 to a vertical cropping module 30 which crops the input video data.

For example, to process input video data in the NTSC standard, the input video data is cropped to 480 lines. For processing input video data in the PAL standard, the input video data is cropped to 576 lines, in which all 576 active lines are used. It is understood that the vertical cropping module 30 may crop the input video data in accordance with the requirements of the particular video standard in use, such as high definition television standards (HDTV), EGA, VGA, Super VGA, etc. Such standards are known in the art. For example, the MPEG standard is discussed in MPEG TEST MODEL 4, "Coded Representation of Picture and Audio Information", ISO-IEC/JTC1/SC29/EG11, CCITT SG XV, Working Party XV/1, Document AVC-445b, February 1993.

For video data from NTSC sources, the vertically cropped video data is received by the 3:2 pulldown processor 32 for processing to detect 3:2 pulldown and to reorder and remove input data fields such as redundant fields to generate 24 frame per second progressive video data. The 3:2 pulldown processor 32 performs such 3:2 pulldown, reordering, and removal of fields in a manner known in the art; for example, as described in U.S. Pat. No. 5,317,398 to Casavant et al. which is incorporated herein by reference. In the disclosed exemplary embodiment, the 3:2 pulldown processor 32 generates delayed video data, and other functions of the 3:2 pulldown processor 32 are described hereafter in reference to FIG. 3.

Referring back to FIG. 2, the delayed video data from the 3:2 pulldown processor 32 is received by the vertical filter and subsampler 34 for performing chroma subsampling. Subsampling is herein defined to include sampling by a factor of 1.

In an exemplary embodiment, the encoding module 16 of the encoder 10 encodes 4:2:0 video data in a manner known in the art; for example, as described in U.S. Pat. Nos. 5,253,056 to Puri et al. and 5,270,813 to Puri et al., each of which is incorporated herein by reference. In the exemplary embodiment, the chroma channel resolution is half of the luma resolution in both the horizontal and vertical directions. For input video data in a 4:2:2 format, the vertical filter and subsampler 34 processes the chroma channels for use by the encoder 10.

If the delayed video data corresponds to film or non-film, the 3:2 pulldown processor 32 indicates such a film condition or a non-film condition by a film flag, as disclosed hereafter. The vertical filter and subsampler 34 responds to the film flag to process the delayed film data such that the video data as progressive film is chroma filtered on a frame basis using a predetermined four tap filter. If the video data is interlaced video data (and thus not progressive film data), the video data is encoded at a full temporal rate with vertical chroma filtering performed on each field independently. In the exemplary embodiment, odd fields are filtered by a predetermined seven tap filter and even fields are filtered by the predetermined four tap filter with the predetermined tap filters being symmetrical.

The chroma filtered video data from the vertical filter and subsampler 34 is processed by an adaptive prefilter 36, by a horizontal filter and subsampler 38, and then by a horizontal cropping module 40 to generate preprocessed video data which is output to the encoding module 16 shown in FIG. 1. The operations of the adaptive prefilter 36, the horizontal filter and subsampler 38, and the horizontal cropping module 40 are describe hereafter in reference to FIG. 5.

Figure 3:
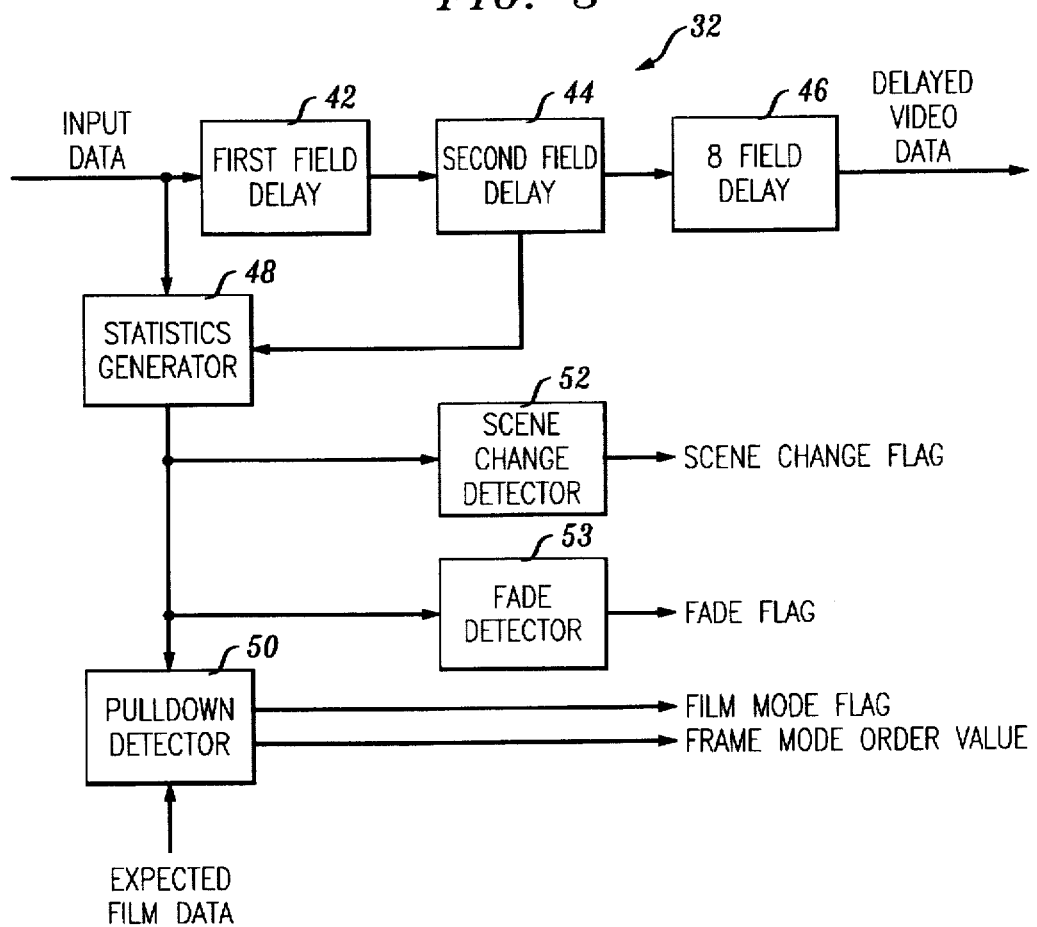
FIG. 3 is a block diagram of a 3:2 pulldown processor in FIG. 2.

Referring to FIG. 3, the 3:2 pulldown processor 32 detects redundant fields in the vertically cropped input video data. 3:2 pulldown is used in displaying films recorded at 24 frames per second on a NTSC television system operating at about 60 Hz, and is achieved by displaying alternating frames of film either for $1/20^{th}$ second or for $1/30^{th}$ second, while an NTSC television camera records either 3 or 2 fields for each film frame, respectively, in a manner known in the art. In the 3:2 pulldown process, redundant fields are created.

The 3:2 pulldown processor 32 receives the input video data and generates delayed video data by delaying the input video data by a predetermined number of fields N, where N>1. In the exemplary embodiment, each of a first field delay 42 and a second field delay 44 delays the input video data by one field to generated a resultant two field delayed video data. The two field delayed video data is then delayed by an 8 field delay 46 to generate the delayed video data which is thus the input video data delayed by a total of 10 fields; i.e. 5 frames.

A statistics generator 48 receives both the input data and the two field delayed data from the second field delay 44 to generate statistics therefrom.

The inter frame statistics and the delayed video data, which is delayed five frames in the exemplary embodiment, enables the encoder module 16 to process the statistics and to adjust the subsequent encoding of the delayed video data. The statistics are used to categorize the incoming video data by control signals such as flags and other data signals, and to enhance any compression in the encoding process by providing a look-ahead capability of the encoder 10. The encoder 10, in using such statistics, flags, and the like, is then able to remove redundancies in the input video signal and to anticipate and takes preventative action before encoding relatively difficult sections of video images such as a scene change in the video images. From instructions of the rate controller 14 responding to flags and other indicators from the preprocessor 12 indicating film or scene changes, the encoder 10 may reschedule or align the next intra frame, thus improving encoded image quality.

In the exemplary embodiment, the input video data corresponds to fields of video pixels having associated Y, $C_b$, and $C_r$ values, from which the statistics generator 48 calculates the following statistics for every input video field:

1) sums of the absolute differences between pixels of successive input fields of the same parity;
2) maximum magnitude of the difference between pixels of low pass filtered (and possibly subsampled) image values of successive input fields of the same parity. In an exemplary embodiment, block averages (or means) of the values of blocks of pixels of the input field are computed and are used as samples of subsampled low pass filtered images of the input field; and
3) average values of the pixel over an input field.

The statistics generator 48 may include digital signal processing means such as a digital signal processing (DSP) circuit or chip, which may be embodied as the DSP 1610 chip available from AT&T Corp. In addition, digital signal processing software known in the art or other equivalent digital signal processing means may be used by the statistics generator 48 for determining the above statistics which are used to by a pulldown detector 50, a scene change detector 52, and a fade detector 53.

Figure 4:
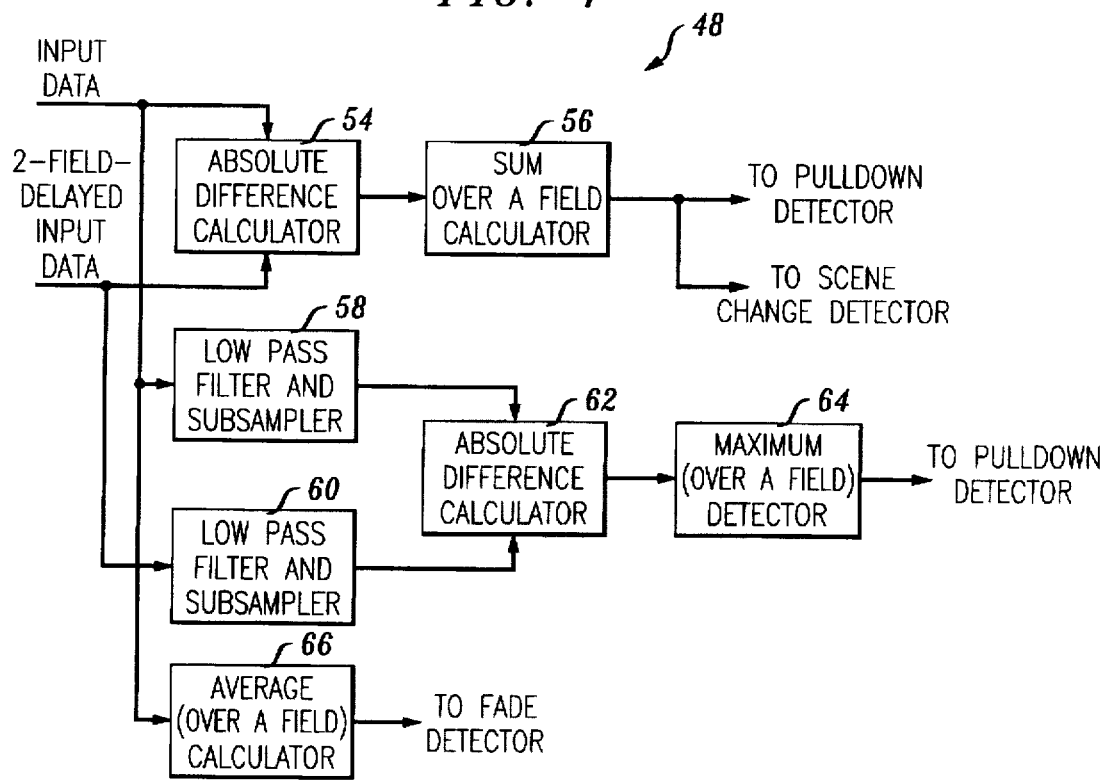
FIG. 4 is a block diagram of the statistics generator of the 3:2 pulldown processor of FIG. 2.

As shown in FIG. 4, the statistics generator 48 receives the input data and two-field delayed input data. The statistics generator 48 includes a first absolute difference calculator 54 for generating absolute values of differences between the input data and the two-field delayed input data, and a first calculator 56 uses the absolute values to generate a sum of the absolute values over a field. The sum is then output to the pulldown detector 50 and the scene change detector 52.

The statistics generator 48 also includes first and second low pass filter and subsamplers 58, 60 which receive the input data and the two-field delayed input data, respectively. The subsampled low pass filtered image values generated therefrom are output to a second absolute difference calculator 62 to generate absolute values of the differences between the low pass filtered image values. A maximum detector 64 determines the maximum absolute value over a field and the maximum absolute value is output to the pulldown detector 50.

The statistics generator 48 also includes an average calculator 66 which determines the average value of the input data over a field, and the average value is output to the fade detector 53.

The following exemplary embodiments of the disclosed video encoder control system and method illustrate the use of statistics generated from the incoming video data to detect film data, scene changes, and video fading, and to adapt the encoding resolution.

FILM DETECTION

In a first exemplary embodiment, the pulldown detector 50 of the 3:2 pulldown processor 32 detects film data present in the incoming video data using the sum of absolute differences between pixels between alternating fields in the incoming video data. Video data of a still or redundant field causes the statistics generator 48 to generate relatively low sums of absolute differences, while video data of a stationary image causes the statistics generator 48 to generate sums of absolute differences which approach zero. In addition, if the video data was generated from converting film images by 3:2 conversion, for every five fields, the sum from the fifth field is relatively small, while the sums from the remaining four of the five fields are relatively large.

The pulldown detector 50 detects the presence of film in the video data by comparing the relative values of the sums generated therefrom to differ by a first predetermined value, causing the pulldown detector 50 to generate a film flag which is sent to the rate controller 14.

The pulldown detector 50 uses the sum of absolute differences and the maximum absolute differences of the low pass filtered images calculated by the statistics generator to detect redundant video fields. Based on the location of redundant fields, a group of 10 fields are classified either as film or as non-film.

The sum of absolute differences between a pair of input fields measures the relative mismatch between the pair of fields in a macro scale. The sum of absolute differences has a small value only if there is a redundant field in the pair.

The maximum absolute differences of the low pass filtered images measures the relative mismatch in local regions of the pair of input fields. The maximum absolute difference has a small value only if there is a redundant field in the pair.

If the input video data was generated from converting film images by 3:2 pulldown, the fifth field and the tenth field in a group of ten fields are redundant fields. Moreover, the mismatch measure between the $6^{th}$ field and the $8^{th}$ field is relatively close to the mismatch measure between the $7^{th}$ field and the $9^{th}$ field. In addition, the mismatch measure between the $4^{th}$ field and the $6^{th}$ field is relatively close to the mismatch measure between the $5^{th}$ field and the $7^{th}$ field, and the mismatch measure between the first field and the third field is relatively close to the mismatch measure between the second field and the fourth field.

In the exemplary embodiment, the pulldown detector 50 maintains six internal statistic first-in-first-out (FIFO) queues having a length of eight units to store statistics of the ten most recent input fields, with the queues as follows:

a) $\{D_Y[0], \ldots, D_Y[7]\}$ stores the sum of absolute field differences of the luma signal;
b) $\{D_{Cr}[0], \ldots, D_{Cr}[7]\}$ stores the sum of absolute field differences of the $C_r$ chroma signal;
c) $\{D_{Cb}[0], \ldots, D_{Cb}[7]\}$ stores the sum of absolute field differences of the $C_b$ signal;
d) $\{d_Y[0], \ldots, d_Y[7]\}$ stores the maximum absolute field differences of the low pass filtered luma signal;
e) $\{d_{Cr}[0], \ldots, d_{Cr}[7]\}$ stores the maximum absolute field differences of the low pass filtered $C_r$ chroma signal; and
f) $\{d_{Cb}[0], \ldots, d_{Cb}[7]\}$ stores the maximum absolute field differences of the low pass filtered $C_b$ chroma signal.

In the above description, the absolute field differences for a given field are calculated over the field.

The pulldown detector 50 also maintains a state variable $\Psi$ which indicates the film mode of the field that is most recently output from the 8 field delay circuit 46. The state variable $\Psi$ is defined as zero if the most recently processed field is non-film, and $\Psi$ takes on one of the values in the range from 1 to 10 which indicates the order of the output field in the ten field 3:2 pulldown pattern. Initially, $\Psi$ is set to zero.

For every input field, the pulldown detector 50 uses the following statistics:

1) $D_Y'$, the sum over a field of absolute field differences of pixel values between the input luminance data and the two-field-delayed luminance data;
2) $D_{C_r}'$, the sum over a field of absolute field differences of pixel values between the input $C_r$ chroma data and the two-field-delayed $C_r$ chroma data;
3) $D_{C_b}'$ the sum over a field of absolute field differences of pixel values between the input $C_r$ chroma data and the two-field-delayed $C_r$ chroma data;
4) $d_Y'$, the maximum value over a field of absolute field differences between pixel values of low pass filtered images of the input luminance data and the two-field-delayed luminance data;
5) $d_{C_r}'$, the maximum value over a field of absolute field differences between pixel values of low pass filtered images of the input $C_r$ chroma data and the two-field-delayed $C_r$ chroma data; and
6) $d_{C_b}'$, the maximum value over a field of absolute field differences between pixel values of low pass filtered images of the input $C_r$ chroma data and the two-field-delayed $C_r$ chroma data.

The pulldown detector 50 updates the statistics FIFOs according to:

$D_Y[n]=D_Y[n-1]$
$D_{C_r}[n]=D_{C_r}[n-1]$
$D_{C_b}[n]=D_{C_b}[n-1]$
$d_Y[n]=d_Y[n-1]$
$d_{C_r}[n]=d_{C_r}[n-1]$
$d_{C_b}[n]=d_{C_b}[n-1]$ for n=1, 2, ..., 7, and $D_Y[0]=D_Y'$
$D_{C_r}[0]=D_{C_r}'$
$D_{C_b}[0]=D_{C_b}'$
$d_Y[0]=d_Y'$
$d_{C_r}[0]=d_{C_r}'$
$d_{C_b}[0]=d_{C_b}'$.

If the current input field is an even (or bottom) field and the current state of $\Psi$ is zero or 10, then the pulldown detector 50 performs film detection as described below, otherwise the pulldown detector 50 does not perform film detection and increases $\Psi$ by 1.

The pulldown detector 50 declares the next ten fields output from the 8 field delay circuit 46 to be film if and only if all of the following conditions in Eq. (1)–(4) are met:

$$D_Y[2] < T_Y \qquad D_Y[7] < T_Y \qquad (1)$$
$$D_{Cr}[2] < T_{Cr} \qquad D_{Cr}[7] < T_{Cr}$$
$$D_{Cb}[2] < T_{Cb} \text{ AND } D_{Cr}[7] < T_{Cb}$$
$$d_Y[2] < t_Y \qquad d_Y[7] < t_Y$$
$$d_{Cr}[2] < t_{Cr} \qquad d_{Cr}[7] < t_{Cr}$$
$$d_{Cb}[2] < t_{Cb} \qquad d_{Cb}[7] < t_{Cb}$$

$$\frac{d_Y[5]}{d_Y[6]} < R_Y \qquad \frac{d_Y[6]}{d_Y[5]} < R_Y \qquad (2)$$
$$\frac{d_{Cr}[5]}{d_{Cr}[6]} < R_{Cr} \text{ AND } \frac{d_{Cr}[6]}{d_{Cr}[5]} < R_{Cr}$$
$$\frac{d_{Cb}[5]}{d_{Cb}[6]} < R_{Cb} \qquad \frac{d_{Cb}[6]}{d_{Cb}[5]} < R_{Cb}$$

$$\frac{d_Y[3]}{d_Y[4]} < R_Y \qquad \frac{d_Y[4]}{d_Y[3]} < R_Y \qquad (3)$$
$$\frac{d_{Cr}[3]}{d_{Cr}[4]} < R_{Cr} \text{ AND } \frac{d_{Cr}[4]}{d_{Cr}[3]} < R_{Cr}$$
$$\frac{d_{Cb}[3]}{d_{Cb}[4]} < R_{Cb} \qquad \frac{d_{Cb}[4]}{d_{Cb}[3]} < R_{Cb}$$

$$\frac{d_Y[0]}{d_Y[1]} < R_Y \qquad \frac{d_Y[1]}{d_Y[0]} < R_Y \qquad (4)$$
$$\frac{d_{Cr}[0]}{d_{Cr}[1]} < R_{Cr} \text{ AND } \frac{d_{Cr}[1]}{d_{Cr}[0]} < R_{Cr}$$
$$\frac{d_{Cb}[0]}{d_{Cb}[1]} < R_{Cb} \qquad \frac{d_{Cb}[1]}{d_{Cb}[0]} < R_{Cb}$$

where $T_Y$, $T_{CR}$, $T_{Cb}$, $t_Y$, $t_{Cr}$, $t_{Cb}$, $R_Y$, $R_{Cr}$, $R_{Cb}$, $R_Y'$, $R_{Cr}'$, and $R_{Cb}'$ are thresholds which may be preset or determined by a priori knowledge of the input data. For example, the thresholds may be set by user input commands or by a set of training data.

If all of Eq. (1)–(4) are satisfied; i.e. the film test yields a positive indication of a film condition, then $\Psi$ is set to 1 and the next 10 fields output from the 8 field delay circuit 46 is classified as film. Otherwise, $\Psi$ is set to zero and the next two fields output from the 8 field delay circuit 46 is classified as non-film (i.e. video) and the above detection process is repeated for new input data.

The pulldown detector 50 also generates a two bit mode order value, having values 0–3 (base 10) to indicate to the rate controller 14 the reconstruction of the frames, as illustrated in Table 1 below:

TABLE 1

| FILM MODE ORDER VALUE | DESCRIPTION |
| --- | --- |
| 0 | FIELD1/FIELD2 |
| 1 | FIELD2/FIELD1 |
| 2 | FIELD1/FIELD2/REPEAT FIELD1 |
| 3 | FIELD2/FIELD1/REPEAT FIELD2 |

DETECTION OF SCENE CHANGES

In a second exemplary embodiment, the statistics generator 48 passes information to the scene change detector 50 that detects the occurrences of instantaneous changes in the scenes, or "cuts", in the input video. The sum of absolute differences between pixels in the current and two-field delayed fields is used to categorize the amount of change between fields. In the typical scene, this parameter is normally small and varies slowly over several frames, even in scenes with apparently unpredictable motion. A scene may therefore be determined to be continuous if all field differences are below a predetermined threshold, $T_{LOW}$, and vary between successive values by a small amount $\Delta T_{LOW}$.

At a cut between scenes, however, this parameter becomes relatively large since the two fields that are used to calculate the field differences occur in different scenes. In this case, the field differences are normally larger than a predetermined threshold $T_{HIGH}$. Furthermore, because the field differences are calculated between alternate fields, upon the occurrence of a scene cut, two consecutive fields have a field difference greater than $T_{HIGH}$.

The detection of a scene change is therefore determined with high confidence when at least two high field differences are detected which are preceded and succeeded by relatively low field differences. The look-ahead nature of the statistics generator 48 allows the detection of a number of succeeding field differences to be proceeded in order to improve the reliability of the scene detection. Furthermore, the scene change may be detected one or more frame times before the scene change enters the encoder module 16 to be encoded. This allows the encoder 10 to change encoding parameters prior to the scene change; for example, for reducing the encoding quality of the frames before the scene change, which may not cause a change in video quality visible to the viewer of the decoded video, while improving encoding efficiency of the encoder 10.

Upon detection of these changes, the scene change detector 52 outputs a scene change flag, which is sent to the rate controller 14. For example, a scene change flag may indicate a picture type such as an intra coding setting. For example, for a scene change attaining a specified confidence level of detection, an intra frame flag may be generated and sent to the rate controller 14 to intra code the entire frame. Intra frame flags may also be output from the scene change detector 52 as an alternative resynchronization method. The statistics generator 48 includes a counter (not shown) for generating a periodic count, and the preprocessor 12 responds to the periodic count for generating an intra frame flag at regular intervals. In the alternative resynchronization method, the preprocessor 12 responds to the scene change flag to generate the intra frame flag, and the rate controller 14 responds to the intra frame flag for inserting an intra frame into the plurality of frames at a position corresponding to a scene change. In this method, the scene change detector 52 chooses to alter the frequency of intra frames according to the relative position of a scene change to make an intra frame and a scene change coincident, where the preprocessor 12 responds to the scene change flag to modify the count of the counter and to generate the intra frame flag upon the modification of the count.

Alternatively, the scene change detector 52 may also output a value, such as an 8-bit value, to the rate controller 14 to indicate the probability or "strength" of a scene change. The 8-bit value may also indicate other scene changes such as partial scene changes.

In addition to detecting film, the 3:2 pulldown processor 32 may also insert intra frames at regular intervals to allow for insertion of commercials and I/P frame coding as an alternative to progressive refresh implementations.

DETECTION OF VIDEO FADING

In a third exemplary embodiment, the fade detector 53 determines a video fade in the video data. The presence of a video fade added to a film as well as the fade rate may cause transitions from film to film or film to video to generate a false detection of the film. The fade detector 53 detects such video transitions from the statistics using the average pixel value as an indication of a relatively large change in brightness of the scene before and after a fade. The fade detector 53 responds to the average pixel values being less than a predetermined value to generate a fade flag indicating a fade in the video.

ADAPTIVE RESOLUTION CONTROL

In a fourth exemplary embodiment, the video encoder control system adapts the resolution of the encoding in response to changes in scenes as measured by frame statistics. The statistics generator 48 of the 3:2 pulldown processor 32 generates the sums of absolute field differences of pixels of the input video data as a measure of the complexity of the corresponding image. Alternatively, variances of the pixels between fields may be calculated. The sums are sent to the rate controller 14 which determines if the sums have exceeded a predetermined value. If the predetermined value is exceeded; i.e. the complexity of the images to be encoded is relatively high, then the rate controller 14 generates a resolution select flag to reduce the resolution of the encoded image, as described hereafter.

Figure 5:
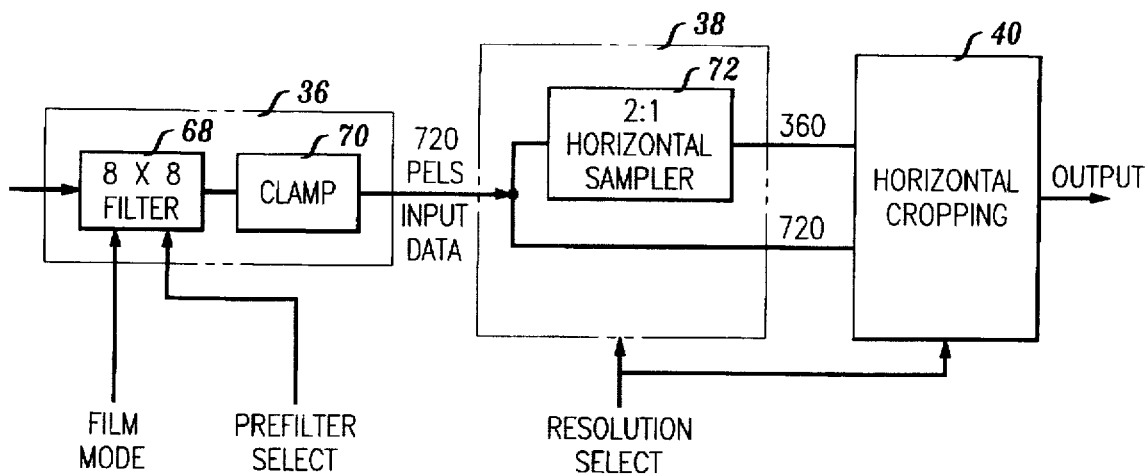
FIG. 5 is a block diagram of components of the preprocessor in FIG. 2.

Referring to FIG. 5, the input video data is processed by the adaptive prefilter 36 in the exemplary embodiment using a first predetermined bank of 256 sets of filter values or coefficients selected by the rate controller 14 using a prefilter select signal at a rate of once every frame. The adaptive prefilter 36 also receives the film flag from the 3:2 pulldown processor 32 which indicates whether the input video data corresponds to progressive film or interlaced video. The adaptive prefilter 36 uses the film flag to select filter values from a second predetermined bank of sets of filter values.

The film mode flag and the prefilter select signals are processed by an 8×8 filter 68 which is a set of 8 horizontal scan line taps and 8 vertical taps to perform 8×8 filtering on a frame basis. The taps of the 8×8 filter are programmable. For example, the taps on every other row may be set to zero, thus reducing the 8×8 filter to an 8×4 filter that may be applied to the pixels of a frame to perform field filtering, with only values from one of the two fields per frame are involved in the computation of the corresponding output value of the filter 68.

When the film flag is off, the filter 68 operates as an 8×4 filter for filtering on a field basis. When the film flag is on, the filter 68 performs 8×8 filtering on a frame basis with the restriction on the taps; i.e. alternate rows of taps being set to zero, is removed. Thus the prefiltering is adaptively performed on a field basis for video material and on a frame basis for film material.

A plurality of filters; i.e. sets of filter values or coefficients, are provided for each type of filtering, such as field basis filtering and frame basis filtering. The plurality of filters are determined by different settings of the taps of the 8×8 filter 68. In addition to adapting the filtering on a field or frame basis depending on whether the input video data is film material or video material, the filter 68 is adaptive by selecting from one of a set of frame filter values or a set of field filter values depending on the difficulty to encode the video data based on the complexity of the video images as well as the state of the encoder 10. The scene complexity may be measured by the sum of the absolute values of the field differences in successive fields of the same parity.

Alternatively, the filter 68 uses the sums of absolute values of field differences as well as an encoder bit rate set by the rate controller 14 to select at least one of the plurality of filter values for filtering the delayed video data.

As some of the predetermined sets of filter values may be negative, possible overflow conditions in the filtering is avoided by clamping or latching the output of the 8×8 filter 68 using a clamp 70 to within an 8-bit range of 0 to 256.

Each of the Y, $C_b$, and $C_r$ values are filtered independently with different sets of filter values in the above described manner.

In the exemplary embodiment, the adaptive prefilter 36 outputs clamped data of 720 pixels which are processed by a 2:1 horizontal subsampler 38. The 2:1 horizontal subsampler 38 responds to the resolution select flag from the rate controller 14 to determine the rate of subsampling. In the exemplary embodiment using the MPEG encoding standard, a 704 mode and a 352 mode are supported. If the 704 mode is selected, the 2:1 horizontal subsampler 72 is disabled, and the processed video data having 704 pixels per line is input to the 2:1 horizontal subsampler 72 and passes through unchanged. If the 352 mode is selected, the Y, $C_b$, and $C_r$ values are subsampled by a factor of two, with the first pixel of each line remaining, to provide 352 pixels per line of resolution.

In an alternative embodiment, the vertical filter and subsampler 34 performs adaptive filtering using the film flag in a manner as described above to perform frame or field filtering. The vertical filter and subsampler 34 thus performs chroma downsampling to convert 4:2:2 chroma to 4:2:0 chroma, depending on whether the video data to be processed is film or video material as determined by the 3:2 pulldown processor 32 by the film flag.

It is understood that one skilled in the art may adapt the disclosed resolution control method using video data statistics to other video standards and video encoders encoding different pixels per line resolutions.

The above resolution control method may also be used in conjunction with the adaptive prefilter 36 described above to provide a finer control of the resolution. In addition, in employing the statistics to control the resolution as well as the look-ahead capability of the encoder 10 from the delay of the input video data, the encoder 10 may be controlled to prepare for scene changes by increasing the resolution using the resolution select flag and reducing the number of bits allocated to at least one frame prior to the scene change to reduce the generation of artifacts in the encoding process.

In alternative embodiments, the above disclosed resolution control method may be used with other encoding methods to choose an encoding method for the I, P or B frames to provide sufficient resolution.

Figure 6:
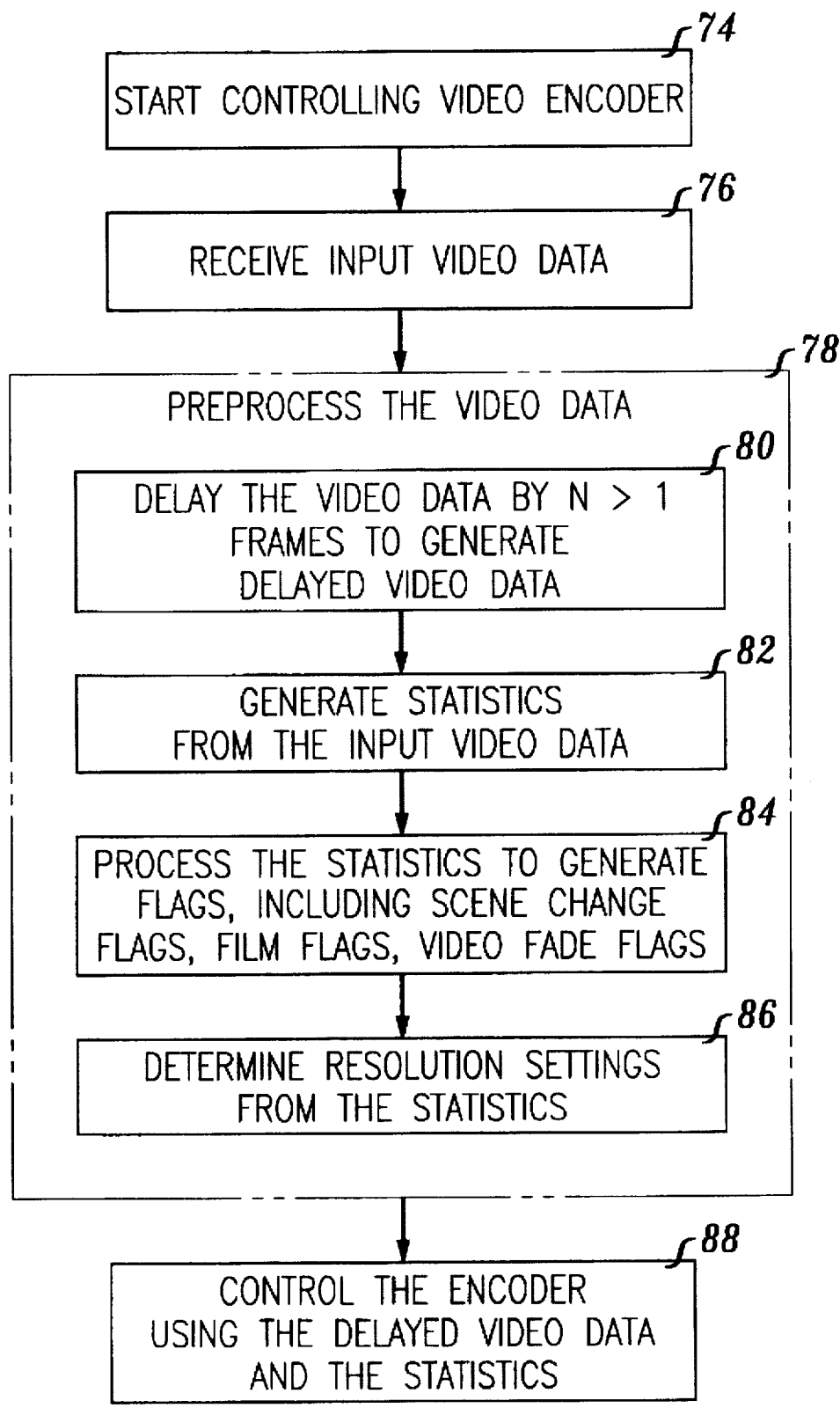
FIG. 6 is a flow chart of the method and operation of the disclosed video encoder control system.

As shown in FIG. 6, a method is disclosed for controlling the video encoder 10, as described above, including the steps of starting the control of the video encoder 10 in step 74; receiving input video data in step 76; preprocessing the video data in step 78; and controlling the encoder 10 using the delayed video data and the statistics in step 88. The step of preprocessing includes the steps of delaying the video data by N frames where N>1, to generate delayed video data in step 80; generating statistics from the input video data in step 82; processing the statistics to generate flags, including scene change flags, film flags, and video fade flags in step 84; and determining resolution settings from the statistics in step 86.

While the disclosed video encoder control system and method has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A video encoder control system including a video encoder comprising:

a processor including:

a multiple field delay circuit for delaying input video data by a predetermined number N frames, N>1, to generate delayed video data, the input video data corresponding to a first frame of a plurality of frames with each frame associated with corresponding fields each having a parity;

a statistics generator for processing the input video data to generate statistics of the first frame and to generate a control signal, the generated statistics including subsampled low pass filter image values, a maximum value over a field of a plurality of absolute values of field differences between pixel values of the subsampled low pass filter image values; and a first detector for detecting a non-film condition using the maximum value for performing film detection.

2. The video encoder control system of claim 1 wherein the processor is operatively associated with the video encoder to encode the input video data in the Motion Picture Experts Group (MPEG) standard.

3. The video encoder control system of claim 1 wherein a rate controller receives the control signal associated with the first frame for controlling an encoder module prior to the encoding of the corresponding delayed video data to perform a look-ahead operation for adjusting the encoding thereof.

4. The video encoder control system of claim 1 wherein the statistics generator generates averages of blocks of pixels of a field as the subsampled low pass filter image values of the field.

5. The video encoder control system of claim 1 wherein the statistics generator calculates the sum of absolute values of field differences between pixels of successive fields having the same parity;

the processor includes a second detector, using the sum, for determining a threshold condition corresponding to the sum exceeds a predetermined threshold, for detecting a scene change from the first frame and a successive frame in response to the threshold condition, for generating a scene change flag as the control signal; and the rate controller controls the encoder module using the scene change flag.

6. The video encoder control system of claim 5 wherein the statistics generator determines an average pixel value of each field; and the second detector uses the average pixel values associated with the first field and successive fields to determine a video fade.

7. The video encoder control system of claim 1 wherein the statistics generator determines the sum of absolute values of field differences between pixels of successive fields having the same parity; and the video encoder control system further includes a resolution selector using the sum for changing the resolution of the encoding of the first frame.

8. The video encoder control system of claim 7 wherein the resolution selector responds to the sum for generating a resolution select signal;

the processor further includes a sampler, responsive to the resolution select signal, for sampling the delayed video data at a resolution corresponding to the resolution select signal.

9. The video encoder control system of claim 1 wherein the statistics generator calculates the sum of absolute values of field differences between pixels of successive fields having the same parity;

the first detector uses the sum for detecting a redundant field as the control signal in the associated fields and for generating a redundancy flag corresponding to the redundant field; and the rate controller controls the encoder module using the redundancy flag.

10. The video encoder control system of claim 9 wherein the first detector performs a 3:2 pulldown detection on the input video data which includes film data.

11. The video encoder control system of claim 10 wherein the first detector, responsive to the 3:2 pulldown detection, generates a film flag; and the processor further includes a prefilter, responsive to the film flag, for filtering the delayed video data using a plurality of filter values corresponding to the film flag.

12. The video encoder control system of claim 11 wherein the prefilter uses the sums of absolute values of field differences and an encoder bit rate to select at least one of the plurality of filter values for filtering the delayed video data.

13. The video encoder control system of claim 11 wherein the prefilter includes a video data clamp for clamping the filtered delayed video data within a predetermined range to prevent filter overflow.

the rate controller responds to the intra frame flag for inserting an intra frame into the plurality of frames at a position corresponding to a scene change.

14. The video encoder control system of claim 9 wherein the first detector uses the maximum values of absolute field differences associated with the first frame and the successive frames to determine a locally changing region as the non-film condition corresponding to the redundancy flag.

15. The video encoder control system of claim 14 wherein the processor includes:

a second detector for detecting a scene change from the first frame and a successive frame and for generating a scene change flag; and a counter for generating a periodic count, the processor responsive to the periodic count for generating an intra frame flag, the processor responds to the scene change flag to generate the intra frame flag; and the rate controller responds to the intra frame flag for inserting an intra frame into the plurality of frames at a position corresponding to the scene change.

16. The video encoder control system of claim 15 wherein the processor responds to the scene change flag to modify the count of the counter and to generate the intra frame flag upon the modification of the count.

17. A video encoder for detecting film and scene changes in input video data corresponding to a plurality of frames to be encoded comprising:

a multiple field delay circuit for delaying first input video data by a predetermined number N of frames, N>1, to generate first delayed video data, the first input video data corresponding to a first frame having associated fields each having a parity;

a statistics generator including a low pass filter for processing the input video data to generate statistics of the first frame, the generated statistics including subsampled low pass filter image values, sums of a plurality of absolute values of field differences, and a maximum value over a field of the plurality of absolute values of field differences between pixel values of the subsampled low pass filter image values; and a first detector using the statistics for detecting a non-film condition of the first frame from the maximum value, for detecting a scene change condition between the plurality of frames from the sums of absolute values exceeding a predetermined threshold, for detecting a video fade condition between the plurality of frames, and for generating film flags, scene change flags, and video fade flags;

an encoding module; and a rate controller responsive to the generated film flags, the generated scene change flags, and the generated video fade flags for controlling the encoding module to encode the first delayed video data.

18. The video encoder of claim 17 wherein the statistics generator determines the sum of absolute values of field differences between pixels of successive fields having the same parity;

the processor includes a resolution selector, responsive to the sum, for generating a resolution select signal; and the rate controller responds to the resolution select signal to change the resolution of the encoding of the first frame.

19. The video encoder of claim 17 further comprising a control module for processing input commands including an expected film command; and wherein the first detector responds to the expected film command for generating the film flags.

20. The video encoder of claim 17 wherein the statistics generator calculates the sum of absolute values of field differences between pixels of successive fields having the same parity; and the first detector uses the sum to detect the scene change condition from the first frame and a successive frame.

21. The video encoder of claim 20 wherein the statistics generator determines an average pixel value of each field; and the video encoder includes a second detector uses the average pixel values associated with the first field and successive fields to determine a video fade condition and to generate a corresponding video fade flag.

22. The video encoder of claim 17 wherein the statistics generator calculates the sum of absolute values of field differences between pixels of successive fields having the same parity; and the first detector uses the sum-for detecting a redundant field in the associated fields from input film data as the input video data, and for generating one of the film flags corresponding to the redundant field.

23. The video encoder of claim 22 wherein the multiple field delay circuit delays the input video data by at least one field to generate second delayed video data; and the statistics generator generates the sum of absolute values of field differences from the input video data and the second delayed video data.

24. The video encoder of claim 22 wherein the statistics generator determines a maximum value of a plurality of absolute field differences of the subsampled low pass filter image values; and the first detector uses the maximum values of absolute field differences associated with the first frame and the successive frames to determine a locally changing region as a non-film condition corresponding to the film flag.

25. A method for controlling a video encoder to encode input video dam corresponding to a plurality of frames associated with corresponding fields each having a parity, the method comprising the steps of:

delaying the input video data by a predetermined number N of frames, N>1, as delayed video data;

processing the input video dam to generate statistics of the first field of the first frame and successive fields, including subsampled low pass filter image values, a sum of a plurality of absolute values of field differences of the subsampled low pass filter image values, and a maximum value over a field of the plurality of absolute values of field differences between pixel values of the subsampled low pass filter image values;

detecting for a non-film condition to generate a film flag using the maximum value for film detection; and controlling the encoding of the delayed video data corresponding to the first frame by the video encoder using the statistics and the film flag.

26. The method of claim 25 including the steps of:

detecting a scene change condition between the plurality of fields from the sum of the plurality of absolute values of field differences exceeding a predetermined threshold;

generating a scene change flag from the scene change condition; and providing the scene change flag to a rate controller for performing the step of controlling the encoding.

27. The method of claim 25 wherein:

generating a resolution select flag from a sum change condition;

the step of processing includes the steps of:

generating sums of absolute values of field differences between pixels of successive fields having the same parity; and detecting a change in the sums as the sum change condition to generate the resolution select flag; and the step of controlling includes the step of changing the resolution of the encoding of the first frame using the resolution select flag.

28. The method of claim 25 including the steps of:

detecting the non-film condition of at least the first field from the statistics;

generating the film flag corresponding to the non-film condition; and providing the film flag to a rate controller for performing the step of controlling the encoding.

29. The method of claim 28 including the steps of:

detecting a redundant field in the associated fields from a sum;

the step of generating includes generating the film flag corresponding to the redundant field from input film data as the input video data; and the step of processing includes the step of calculating the sum from absolute field differences between pixels of the first field and successive fields of the same parity as the first field.

30. The method of claim 29 further comprising the step of detecting a scene change condition includes the step of detecting a scene change from the first frame and a successive frame using the sum.

31. The method of claim 30 wherein the step of processing includes the step of determining a subsampled low pass filter image value of the first field and successive fields; and the step of detecting includes the steps of:

using a maximum value of the absolute field differences of the subsampled low pass filter values of the first field and the successive fields to determine a locally changing region as a non-film condition; and generating the film flag upon the maximum value of absolute field differences exceeding a predetermined value.

32. The method of claim 30 wherein: the step of processing includes the step of determining an average pixel value of each field; and the step of detecting includes the steps of:

using the average pixel values of the first field and the successive fields to determine a video fade; and generating a video fade flag upon the average pixel values exceeding a predetermined value.

\* \* \* \* \*